(12) United States Patent
Kikuchi (10) Patent No.: US 7,721,833 B2
(45) Date of Patent: May 25, 2010

(54) HYBRID VEHICLE, CONTROL METHOD OF HYBRID VEHICLE, AND POWER OUTPUT APPARATUS

(75) Inventor: Yoshiaki Kikuchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 777 days.

(21) Appl. No.: 10/590,292

(22) PCT Filed: Jul. 7, 2005

(86) PCT No.: PCT/JP2005/012970

§ 371 (c)(1), (2), (4) Date: Aug. 23, 2006

(87) PCT Pub. No.: WO2006/009049

PCT Pub. Date: Jan. 26, 2006

(65) Prior Publication Data

US 2007/0185629 A1     Aug. 9, 2007

(30) Foreign Application Priority Data

Jul. 15, 2004     (JP) .............................. 2004-208898

(51) Int. Cl.
*B60W 20/00*     (2006.01)
(52) U.S. Cl. .............................. 180/65.28; 180/65.265; 180/65.285
(58) Field of Classification Search .............. 180/65.28, 180/65.265, 65.285, 65.25
See application file for complete search history.

(56) References Cited

U.S. PATENT DOCUMENTS

| | | | |
|---|---|---|---|
| 6,328,671 B1 * | 12/2001 | Nakajima et al. ............. | 477/46 |
| 6,352,489 B1 * | 3/2002 | Kuroda et al. ................. | 477/5 |
| 6,453,222 B1 * | 9/2002 | Lasson et al. ................. | 701/22 |
| 6,500,089 B2 * | 12/2002 | Lasson et al. ................. | 477/3 |
| 6,931,318 B2 * | 8/2005 | Kaita et al. ................. | 701/113 |
| 6,965,824 B2 * | 11/2005 | Ichimoto et al. ............ | 701/113 |
| 7,062,916 B2 * | 6/2006 | Kamijo et al. ................. | 60/706 |

(Continued)

FOREIGN PATENT DOCUMENTS

EP     1 013 498 A     6/2000

(Continued)

*Primary Examiner*—Jeffrey J Restifo
(74) *Attorney, Agent, or Firm*—Kenyon & Kenyon LLP (57) ABSTRACT

When a drive power demand Pv* is greater than 0, the control procedure of the invention sets the greater between an engine speed demand Nereq and a lower engine speed limit Nemin to a target rotation speed Ne* of an engine (step S160). The engine speed demand Nereq represents a rotation speed of the engine at a specific drive point that ensures efficient output of an engine power demand Pe*. The lower engine speed limit Nemin represents a rotation speed of the engine at another specific drive point for a constant-speed drive of a hybrid vehicle at a current vehicle speed V. When the drive power demand Pv* is equal to 0, the control procedure of the invention cuts fuel supply to the engine and sets the lower engine speed limit Nemin to the target rotation speed Ne* of the engine (step S190). The engine is accordingly driven at the rotation speed of not lower than the lower engine speed limit Nemin and has a quick response to a demand for output power increase from the engine. This arrangement desirably reduces the loading of a battery and prevents premature deterioration of the battery.

11 Claims, 7 Drawing Sheets

U.S. PATENT DOCUMENTS

| | | | |
|---|---|---|---|
| 7,108,088 B2 * | 9/2006 | Muta | 180/65.235 |
| 7,165,638 B2 * | 1/2007 | Ito et al. | 180/65.23 |
| 7,204,230 B2 * | 4/2007 | Bevan et al. | 123/350 |
| 7,213,665 B2 * | 5/2007 | Yamaguchi et al. | 180/65.27 |
| 7,255,662 B2 * | 8/2007 | Hiroe et al. | 477/3 |
| 7,268,442 B2 * | 9/2007 | Syed et al. | 290/40 C |
| 7,272,484 B1 * | 9/2007 | Maeda et al. | 701/102 |
| 7,291,093 B2 * | 11/2007 | Yamamoto et al. | 477/110 |
| 7,406,378 B2 * | 7/2008 | Harada et al. | 701/103 |
| 7,430,469 B2 * | 9/2008 | Kaita | 701/102 |
| 7,431,111 B2 * | 10/2008 | Nada | 180/65.28 |
| 7,444,220 B2 * | 10/2008 | Yamazaki | 701/51 |
| 7,448,981 B2 * | 11/2008 | Mashiki | 477/3 |
| 7,463,968 B2 * | 12/2008 | Snyder | 701/112 |
| 7,472,769 B2 * | 1/2009 | Yamanaka et al. | 180/65.25 |
| 7,477,031 B2 * | 1/2009 | Ogata et al. | 318/430 |
| 7,523,797 B2 * | 4/2009 | Kimura et al. | 180/65.25 |
| 7,532,961 B2 * | 5/2009 | Hoshiba et al. | 701/22 |
| 2002/0107617 A1 | 8/2002 | Tomikawa | |
| 2002/0123836 A1 | 9/2002 | Komiyama et al. | |

FOREIGN PATENT DOCUMENTS

| | | |
|---|---|---|
| EP | 1 157 873 A2 | 11/2001 |
| EP | 1 300 273 A2 | 4/2003 |
| JP | 09-222064 | 8/1997 |
| JP | 11-093727 A | 4/1999 |
| JP | 2000-032611 | 1/2000 |
| JP | 2002-295283 | 10/2002 |
| JP | 2003-328804 A | 11/2003 |
| JP | 2004-350363 A | 12/2004 |
| JP | 2005-002989 A | 1/2005 |

* cited by examiner

HYBRID VEHICLE, CONTROL METHOD OF HYBRID VEHICLE, AND POWER OUTPUT APPARATUS

This is a 371 national phase application of PCT/JP2005/012970 filed 07 Jul. 2005, claiming priority to Japanese Patent Application No. 2004-208898 filed 15 Jul. 2004, the contents of which are incorporated herein by reference.

TECHNICAL FIELD

The present invention relates to a hybrid vehicle, a control method of the hybrid vehicle, and a power output apparatus.

BACKGROUND ART

One proposed hybrid vehicle has an engine, a planetary gear unit including a carrier and a ring gear respectively linked to a crankshaft of the engine and to a drive shaft, a first motor connected to a sun gear of the planetary gear unit, a second motor connected to the drive shaft, and a battery capable of transmitting electric power to and from the first motor and the second motor (see, for example, Japanese Patent Laid-Open Gazette No. 11-93727). In this proposed hybrid vehicle, the first motor is driven and controlled to regulate the rotation speed of the engine.

DISCLOSURE OF THE INVENTION

In the hybrid vehicle equipped with the engine and the driving motor, the general control procedure varies the rotation speed of the engine and intermittently activates and inactivates the engine with a variation in required engine power, in order to enhance the energy efficiency. In response to the driver's deceleration demand, the required engine power basically decreases to 0 or to a braking power level (friction work) and accordingly lowers the engine rotation speed. The driver may give a high acceleration demand immediately after the deceleration demand. The driving motor is activated with electric power supply from the battery to compensate for an insufficient power due to a poor response of the engine. A high-capacity battery sufficiently supplies required electric power to supplement the power insufficiency, but naturally has large dimensions and mass to be unsuitable for the equipment of the hybrid vehicle. A low-capacity battery, however, can not sufficiently supply required electric power to supplement the power insufficiency. A large power insufficiency increases the required electric power to be discharged from the battery. Repeated charges and discharges of the battery with relatively large electric powers even within an allowable range of input and output limits undesirably cause premature deterioration of the battery.

The hybrid vehicle, the control method of the hybrid vehicle, and the power output apparatus of the invention thus aim to enhance a response to a demand for varying power output from an internal combustion engine. The hybrid vehicle, the control method of the hybrid vehicle, and the power output apparatus of the invention also aim to reduce the loading of an accumulator unit, such as a secondary battery. The hybrid vehicle, the control method of the hybrid vehicle, and the power output apparatus of the invention further aim to enhance the energy efficiency of the hybrid vehicle or the power output apparatus.

At least part of the above and the other related objects are attained by the hybrid vehicle, the control method of the hybrid vehicle, and the power output apparatus having the configurations and arrangements discussed below.

The present invention is directed to a hybrid vehicle including: an internal combustion engine; an electric power-mechanical power input output mechanism that is connected to an output shaft of the internal combustion engine and to a drive shaft linked with one axle of the hybrid vehicle and inputs and outputs power from and to the output shaft and the drive shaft through input and output of electric power and mechanical power; a motor that inputs and outputs power from and to either of the one axle and the other axle, which is different from the one axle; an accumulator unit that transmits electric power to and from the electric power-mechanical power input output mechanism and the motor; a drive power demand setting module that sets a drive power demand required for a drive of the hybrid vehicle; a vehicle speed measurement module that measures vehicle speed of the hybrid vehicle; a lower rotation speed limit setting module that sets a lower rotation speed limit, which represents a minimum allowable rotation speed of the internal combustion engine, corresponding to the measured vehicle speed; and a control module that controls the internal combustion engine, the electric power-mechanical power input output mechanism, and the motor to drive the internal combustion engine at a rotation speed of not lower than the set lower rotation speed limit and to drive the hybrid vehicle with a power corresponding to the set drive power demand.

The hybrid vehicle of the invention sets the lower rotation speed limit, which is the minimum allowable rotation speed of the internal combustion engine, corresponding to the measured vehicle speed. The internal combustion engine, the electric power-mechanical power input output mechanism, and the motor are controlled to drive the internal combustion engine at a rotation speed of not lower than the set lower rotation speed limit and to drive the hybrid vehicle with a power corresponding to the set drive power demand. The internal combustion engine may increase the output power by increasing only the rotation speed with a fixed output torque or by increasing only the output torque with a fixed rotation speed. The output torque increase attained by varying the intake air flow and the amount of fuel injection requires a less time than the rotation speed increase. The output power increase with the output torque variation can thus be attained within a shorter time period than the output power increase with the rotation speed variation. The internal combustion engine driven at the rotation speed of not lower than the lower rotation speed limit, which depends upon the measured vehicle speed, has a quicker response to a demand for a power increase to be output from the internal combustion engine. This arrangement desirably decreases the output power of the motor, which is activated to compensate for an insufficiency of the power required for driving the hybrid vehicle due to a delayed response of the internal combustion engine, thus effectively reducing the loading of the accumulator unit.

In one preferable embodiment of the invention, the hybrid vehicle further includes a rotation speed demand setting module that sets a rotation speed demand, at which the internal combustion engine is to be driven, corresponding to the set drive power demand. The control module controls the internal combustion engine, the electric power-mechanical power input output mechanism, and the motor to drive the internal combustion engine at a higher rotation speed between the set lower rotation speed limit and the set rotation speed demand. The internal combustion engine is thus driven at the rotation speed determined by taking into account both the rotation speed demand, which depends upon the drive power demand, and the lower rotation speed limit, which depends upon the vehicle speed. Namely the internal combustion engine is driven at an adequate drive point. The rotation speed demand setting module may set the rotation speed demand to a specific rotation speed of the internal combustion engine that ensures efficient output of the power corresponding to the set drive power demand from the internal combustion engine. This arrangement maintains the high response of the internal combustion engine, while enhancing the energy efficiency of the hybrid vehicle.

In the hybrid vehicle of the invention, it is preferable that the lower rotation speed limit setting module sets the lower rotation speed limit to a rotation speed of not lower than a specific rotation speed of the internal combustion engine at a specific drive point that ensures efficient output of a required power from the internal combustion engine for a constant-speed drive of the hybrid vehicle on substantially flat road surface at the measured vehicle speed. Even in the case of a small current power demand to be output from the internal combustion engine, this arrangement enables the internal combustion engine to promptly output a power required for a constant-speed drive of the hybrid vehicle or a greater power, in response to a subsequent demand for an output power variation.

In the hybrid vehicle of the invention, it is also preferable that the control module controls the internal combustion engine, the electric power-mechanical power input output mechanism, and the motor to stop fuel injection to the internal combustion engine, when the set drive power demand is equivalent to a predetermined braking power for braking the hybrid vehicle. This arrangement improves the fuel consumption and enhances the total energy efficiency of the hybrid vehicle.

In the hybrid vehicle of the invention, it is preferable that the electric power-mechanical power input output mechanism includes a three shaft-type power input output module that is linked to three shafts, that is, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft. Further, it is preferable that the electric power-mechanical power input output mechanism includes a pair-rotor motor that has a first rotor connected to the output shaft of the internal combustion engine and a second rotor connected to the drive shaft and is driven through relative rotation of the first rotor to the second rotor.

The present invention is directed to a power output apparatus that outputs power to a drive shaft and includes: an internal combustion engine; an electric power-mechanical power input output mechanism that is connected to an output shaft of the internal combustion engine and to the drive shaft and inputs and outputs power from and to the output shaft and the drive shaft through input and output of electric power and mechanical power; a motor that inputs and outputs power from and to the drive shaft; an accumulator unit that transmits electric power to and from the electric power-mechanical power input output mechanism and the motor; a power demand setting module that sets a power demand required for the drive shaft; a rotation speed measurement module that measures rotation speed of the drive shaft; a lower rotation speed limit setting module that sets a lower rotation speed limit, which represents a minimum allowable rotation speed of the internal combustion engine, corresponding to the measured rotation speed; and a control module that controls the internal combustion engine, the electric power-mechanical power input output mechanism, and the motor to drive the internal combustion engine at a rotation speed of not lower than the set lower rotation speed limit and to output a power corresponding to the set power demand to the drive shaft.

The power output apparatus of the invention sets the lower rotation speed limit, which is the minimum allowable rotation speed of the internal combustion engine, corresponding to the measured rotation speed of the drive shaft. The internal combustion engine, the electric power-mechanical power input output mechanism, and the motor are controlled to drive the internal combustion engine at a rotation speed of not lower than the set lower rotation speed limit and to output a power corresponding to the set power demand to the drive shaft. As described above, the output power increase with the output torque variation can be attained within a shorter time period than the output power increase with the rotation speed variation. The internal combustion engine driven at the rotation speed of not lower than the lower rotation speed limit, which depends upon the measured rotation speed of the drive shaft, has a quicker response to a demand for a power increase to be output from the internal combustion engine. This arrangement desirably decreases the output power of the motor, which is activated to compensate for an insufficiency of the power required for the drive shaft due to a delayed response of the internal combustion engine, thus effectively reducing the loading of the accumulator unit. The power output apparatus of the invention may be mounted on a vehicle, which has one axle linked with the drive shaft. The internal combustion engine is then driven at a rotation speed of not lower than the lower rotation speed limit, which depends upon the rotation speed of the axle. The arrangement of setting the lower rotation speed limit corresponding to the vehicle speed in place of the rotation speed of the axle is within the scope of the characteristics of the hybrid vehicle of the invention described above. Namely the various embodiments and arrangements of the hybrid vehicle of the invention described above are applicable to the power output apparatus with replacement of the vehicle speed by the rotation speed of the drive shaft.

The present invention is directed to a control method of a hybrid vehicle including: an internal combustion engine; an electric power-mechanical power input output mechanism that is connected to an output shaft of the internal combustion engine and to a drive shaft linked with one axle of the hybrid vehicle and inputs and outputs power from and to the output shaft and the drive shaft through input and output of electric power and mechanical power; a motor that inputs and outputs power from and to either of the one axle and the other axle, which is different from the one axle; and an accumulator unit that transmits electric power to and from the electric power-mechanical power input output mechanism and the motor, and the control method includes the steps of: (a) setting a drive power demand required for a drive of the hybrid vehicle; (b) setting a lower rotation speed limit, which represents a minimum allowable rotation speed of the internal combustion engine, corresponding to a measured vehicle speed; and (c) controlling the internal combustion engine, the electric power-mechanical power input output mechanism, and the motor to drive the internal combustion engine at a rotation speed of not lower than the set lower rotation speed limit and to drive the hybrid vehicle with a power corresponding to the set drive power demand.

The control method of the hybrid vehicle of the invention sets the lower rotation speed limit, which is the minimum allowable rotation speed of the internal combustion engine, corresponding to the measured vehicle speed. The internal combustion engine, the electric power-mechanical power input output mechanism, and the motor are controlled to drive the internal combustion engine at a rotation speed of not lower than the set lower rotation speed limit and to drive the hybrid vehicle with a power corresponding to the set drive power demand.

This control procedure ensures a quick response of the internal combustion engine to a demand for a power increase to be output from the internal combustion engine. This arrangement desirably decreases the output power of the motor, which is activated to compensate for an insufficiency of the power required for driving the hybrid vehicle due to a delayed response of the internal combustion engine, thus effectively reducing the loading of the accumulator unit.

BEST MODES OF CARRYING OUT THE INVENTION

Figure 1:
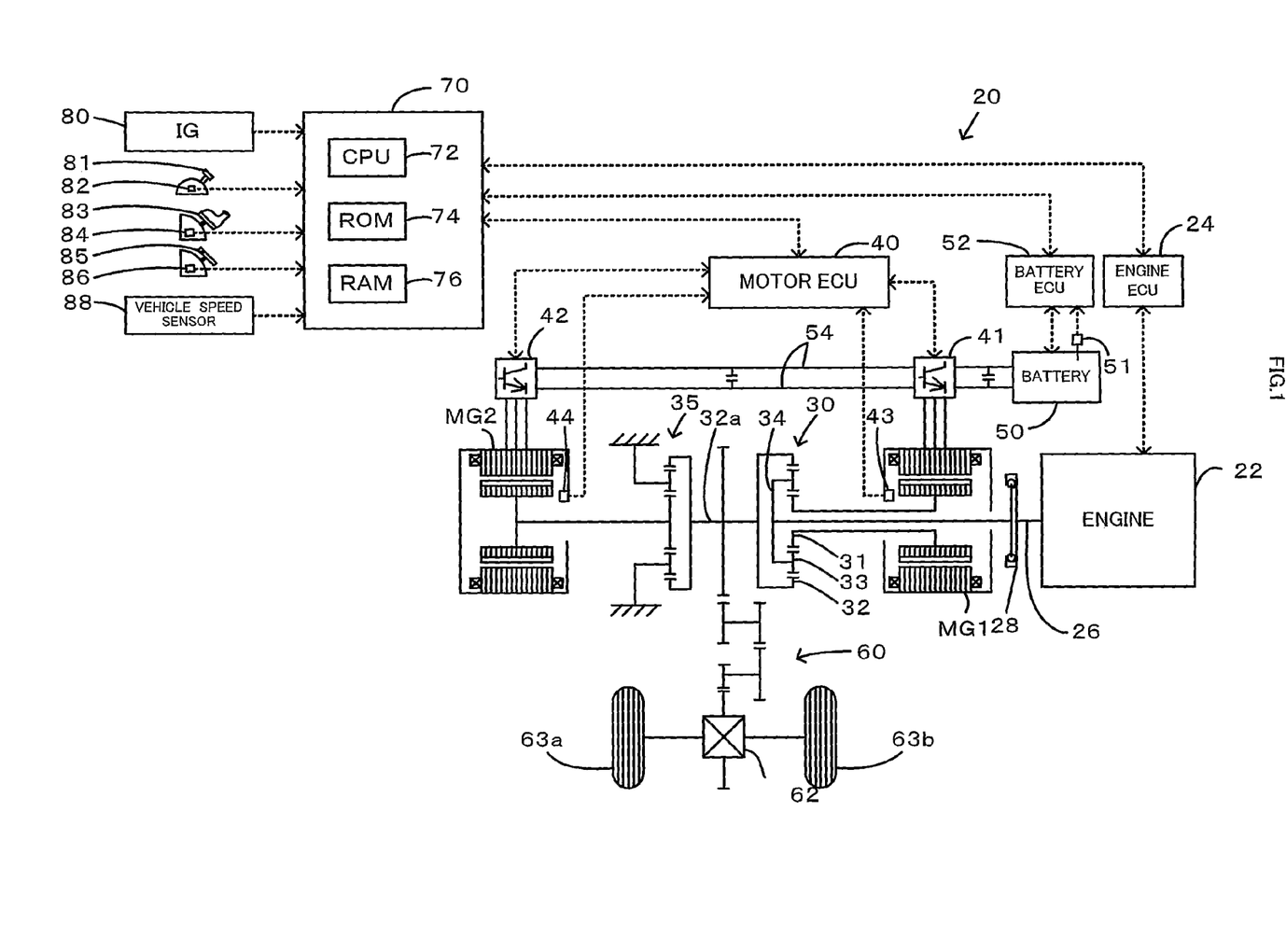
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously. said motor.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
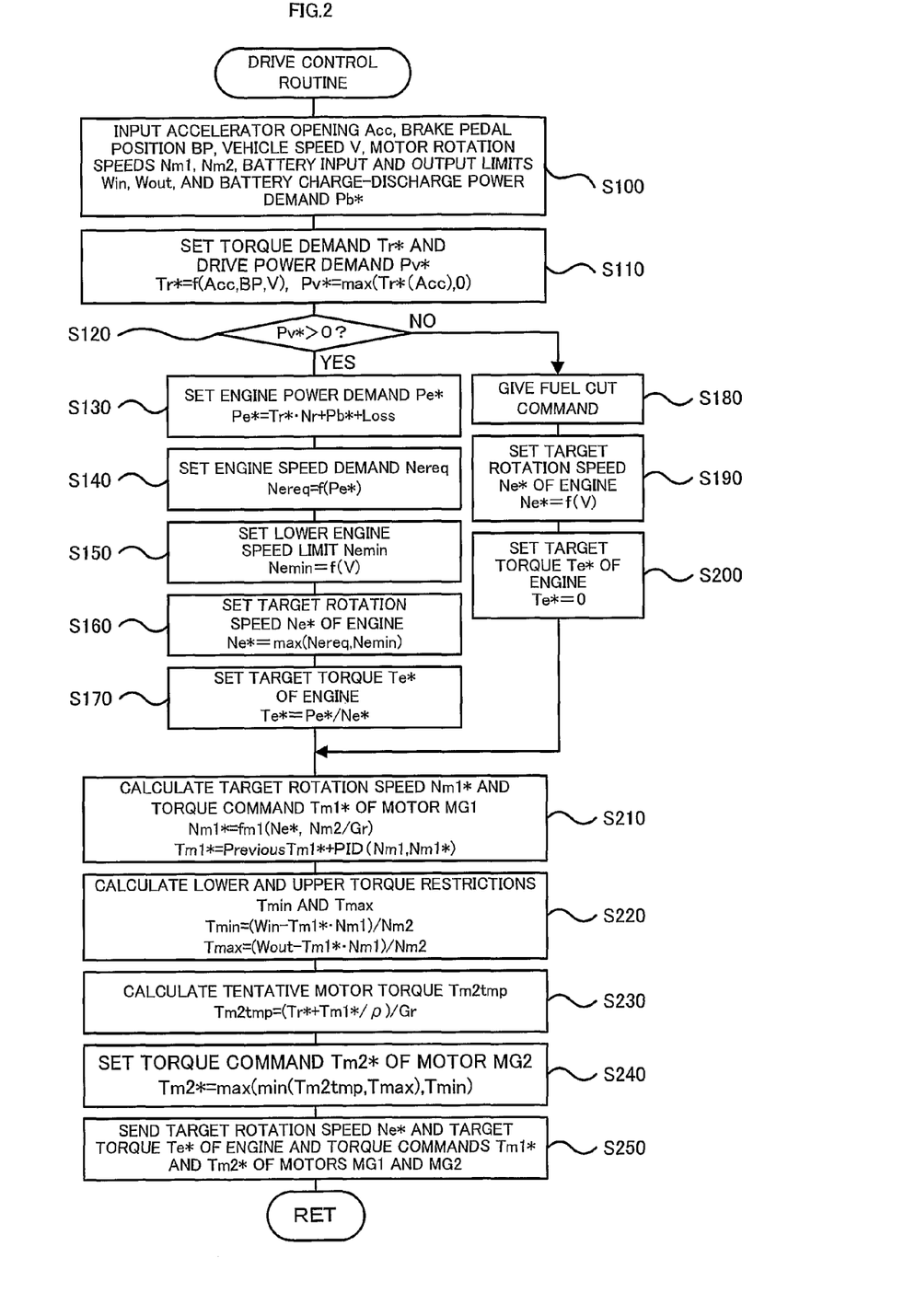
FIG. 2 is a flowchart showing a drive control routine executed by a hybrid electronic control unit included in the hybrid vehicle of FIG. 1.

The description now regards the operations of the hybrid vehicle 20 of the embodiment having the configuration discussed above. FIG. 2 is a flowchart showing a drive control routine executed by the hybrid electronic control unit 70. This routine is carried out repeatedly at preset time intervals (for example, at every several msec).

In the drive control routine, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, rotation speeds Nm1 and Nm2 of the motors MG1 and MG2, and an input limit Win, and an output limit Wout, and a charge-discharge power demand Pb* of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the temperature Tb of the battery 50 measured by the temperature sensor 51 and the observed current state of charge (SOC) of the battery 50 and are received from the battery ECU 52 by communication. The charge-discharge power demand Pb* of the battery 50 is set based on the current state of charge (SOC) of the battery 50 and is received from the battery ECU 52 by communication.

Figure 3:
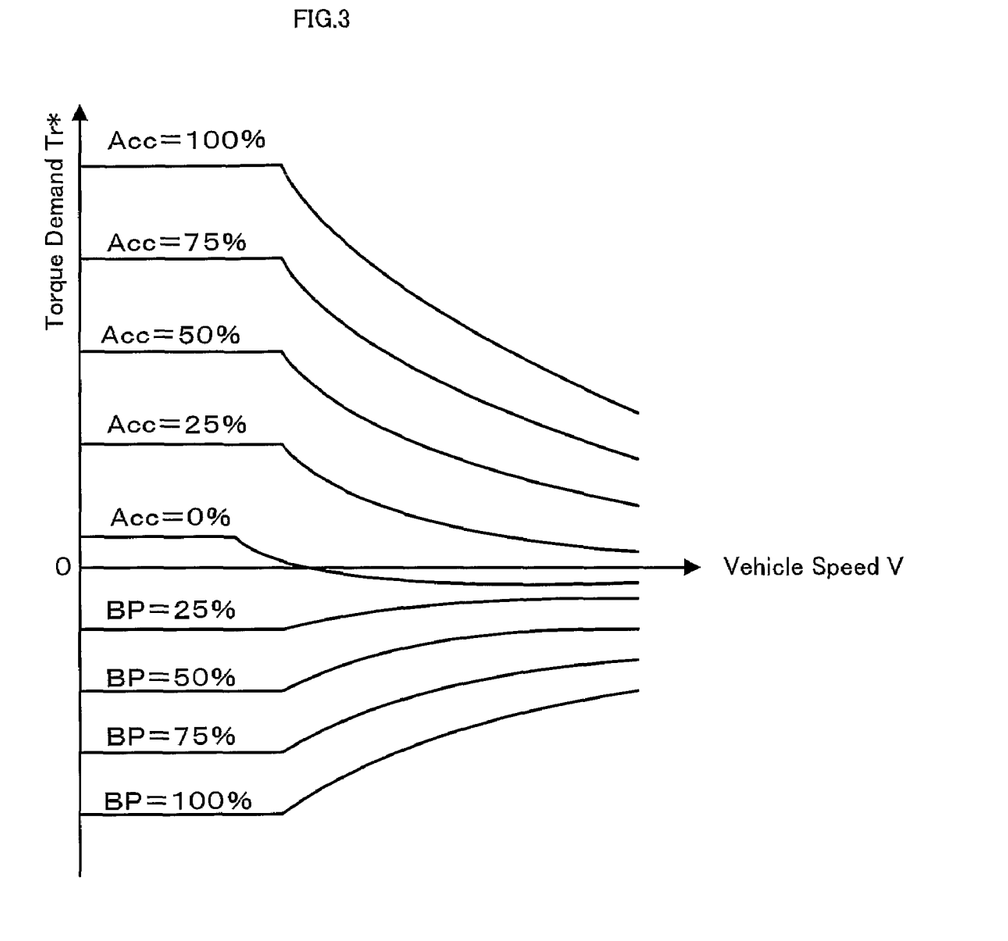
FIG. 3 shows one example of a torque demand setting map.

After the data input, the CPU 72 sets a torque demand Tr* to be output to the ring gear shaft 32a or the drive shaft linked to the drive wheels 63a and 63b as the torque required for the vehicle and a drive power demand Pv* required to drive the hybrid vehicle 20, based on the input accelerator opening Acc, the input brake pedal position BP, and the input vehicle speed V (step S110). A concrete procedure of setting the torque demand Tr* in this embodiment stores in advance variations in torque demand Tr* against the accelerator opening Acc, the brake pedal position BP, and the vehicle speed V as a torque demand setting map in the ROM 74 and reads the torque demand Tr* corresponding to the given accelerator opening Acc, the given brake pedal position BP, and the given vehicle speed V from the map. One example of the torque demand setting map is shown in FIG. 3. The drive power demand Pv* is set to the greater between a value '0' and the product of the torque demand Tr*, which depends on the accelerator opening Acc, and a rotation speed Nr of the ring gear shaft 32a. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 4:
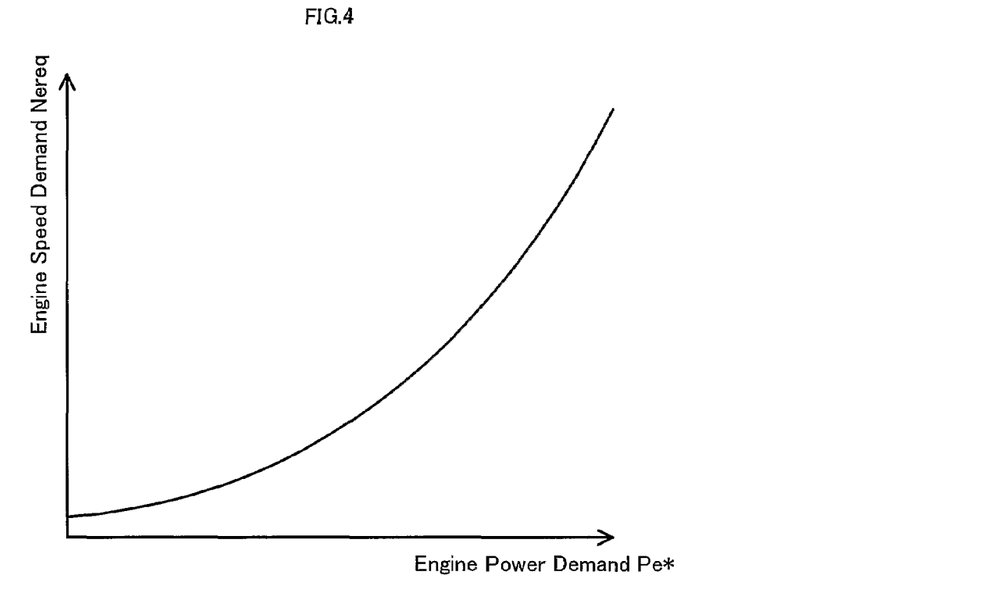
FIG. 4 shows one example of an engine speed demand setting map.
Figure 5:
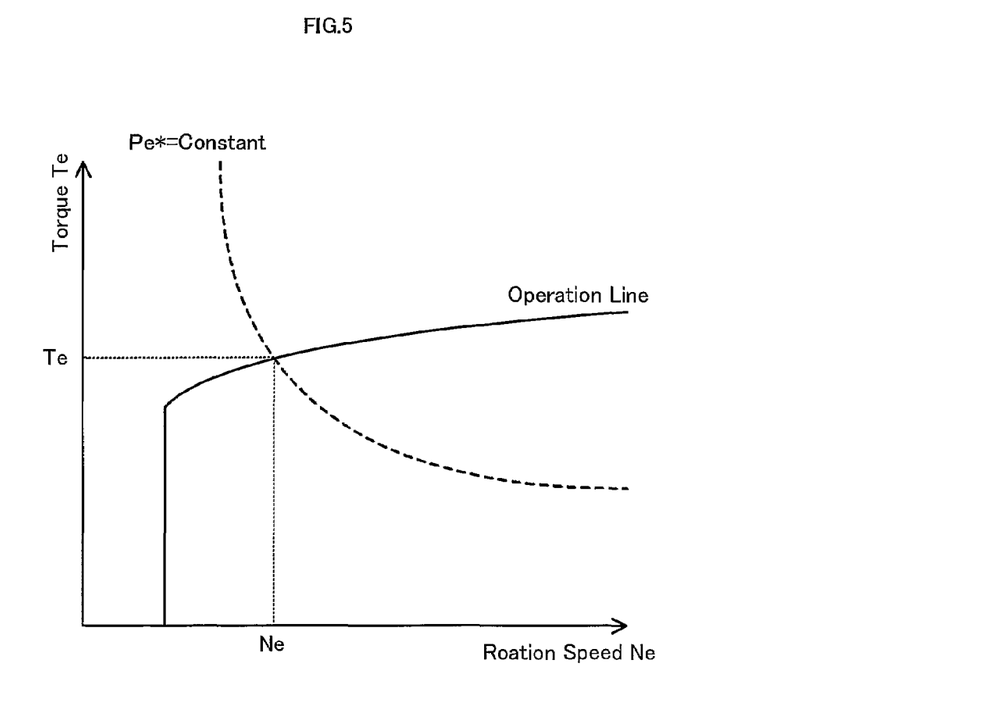
FIG. 5 shows an operation line of an engine with a constant curve of engine power demand Pe*.

The drive power demand Pv* is then compared with the value '0' (step S120). When the drive power demand Pv* is equal to 0, the torque demand Tr* is either 0 or a negative value. This means no requirement of power output from the engine 22 and thus allows the engine 22 to be at a stop as described later. When the drive power demand Pv* is greater than 0 at step S120, power output from the engine 22 is required. An engine power demand Pe* to be output from the engine 22 is accordingly calculated as the sum of the product of the torque demand Tr* and the rotation speed Nr of the ring gear shaft 32a, the charge-discharge power demand Pb* of the battery 50, and a potential loss (step S130). An engine speed demand Nereq is set as a rotation speed of the engine 22 at an efficient drive point that ensures efficient output of the engine power demand Pe* from the engine 22 (step S140). A concrete procedure of setting the engine speed demand Nereq in this embodiment stores in advance a variation in engine speed demand Nereq against the engine power demand Pe* as an engine speed demand setting map in the ROM 74 and reads the engine speed demand Nereq corresponding to the given engine power demand Pe* from the map. One example of the engine speed demand setting map is shown in FIG. 4. The efficient drive point of the engine 22 (rotation speed Nextorque Te) ensuring the efficient output of the engine power demand Pe* may be expressed by an operation line in a torque-rotation speed map as shown in FIG. 5. The combination of the rotation speed and the torque at an intersection between a curve of constant engine power demand Pe* (shown by the broken line) and the operation line gives the efficient drive point of the engine 22 ensuring the efficient output of the engine power demand Pe*.

Figure 6:
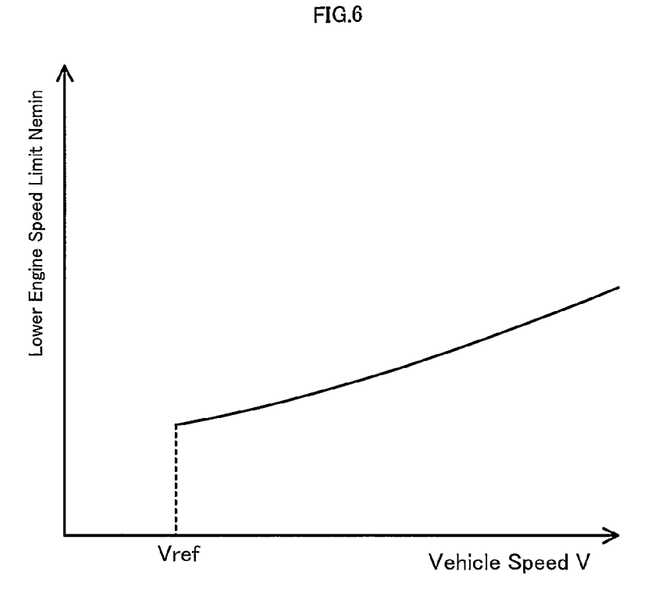
FIG. 6 shows one example of a lower engine speed setting map.

The CPU 72 subsequently sets a lower engine speed limit Nemin as a rotation speed of the engine 22 at a specific drive point that ensures efficient output of a required power from the engine 22 for a constant-speed drive of the hybrid vehicle 20 at the vehicle speed V (step S150). A concrete procedure of setting the lower engine speed limit Nemin in this embodiment stores in advance a variation in lower engine speed limit Nemin against the vehicle speed V as a lower engine speed limit setting map in the ROM 74 and reads the lower engine speed limit Nemin corresponding to the given vehicle speed V from the map. One example of the lower engine speed limit setting map is shown in FIG. 6. A reference vehicle speed Vref shown in FIG. 6 is set as a criterion for determining requirement of intermittent operations of the engine 22.

The CPU 72 then sets the greater between the engine speed demand Nereq and the lower engine speed limit Nemin to a target rotation speed Ne* of the engine 22 (step S160), and divides the engine power demand Pe* by the target rotation speed Ne* to calculate a target torque Te* of the engine 22 (step S170). Setting the greater between the engine speed demand Nereq and the lower engine speed limit Nemin to the target rotation speed Ne* of the engine 22 aims to assure a quicker response to an abrupt increase in engine power demand Pe*. In one example, the driver may step on the accelerator pedal 83 in a decelerating state with some decrease (but not to the zero level) in drive power demand Pv*, while the hybrid vehicle 20 runs at a relatively high speed. Under such conditions, the engine speed demand Nereq is lower than the lower engine speed limit Nemin. In general, the engine power increase by only a torque rise is attained within a shorter time period than the engine power increase by only a rotation speed rise. This is ascribed to the less time required for increasing the intake air flow and the amount of fuel injection than the time required for increasing the rotation speed of the rotational system of the engine 22. Namely the engine 22 driven at the lower engine speed limit Nemin, which is higher than the engine speed demand Nereq, has a quicker response to a demand for output power increase from the engine 22.

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S210):

$$Nm1^*=Ne^*\cdot(1+\rho)/\rho-Nm2/(Gr\cdot\rho) \quad (1)$$

$$Tm1^*=\text{Previous } Tm1^*+k1(Nm1^*-Nm1)+k2\int(Nm1^*-Nm1)dt \quad (2)$$

Figure 7:
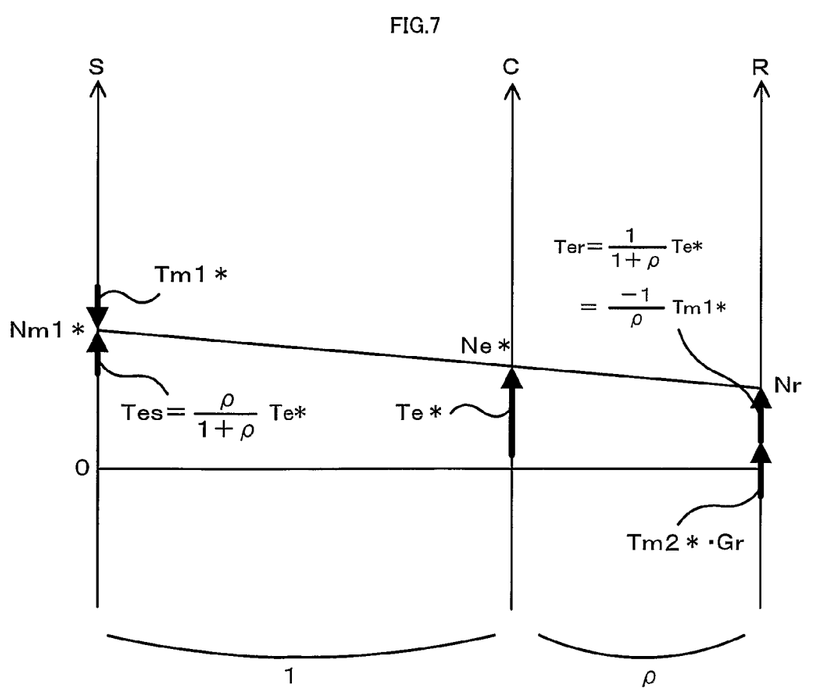
FIG. 7 is an alignment chart showing torque-rotation speed dynamics of respective rotation elements of a power distribution integration mechanism included in the hybrid vehicle of FIG. 1.

Equation (1) is a dynamic relational expression of the rotation elements included in the power distribution integration mechanism 30. FIG. 7 is an alignment chart showing torque-rotation speed dynamics of the respective rotation elements included in the power distribution integration mechanism 30. The left axis 'S' represents the rotation speed of the sun gear 31 that is equivalent to the rotation speed Nml of the motor MG1. The middle axis 'C' represents the rotation speed of the carrier 34 that is equivalent to the rotation speed Ne of the engine 22. The right axis 'R' represents the rotation speed Nr of the ring gear 32 that is obtained by multiplying the rotation speed Nm2 of the motor MG2 by the gear ratio Gr of the reduction gear 35. Equation (1) is readily introduced from this alignment chart of FIG. 7. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S220):

$$Tmin=(Win-Tm1^*\cdot Nm1)/Nm2 \quad (3)$$

$$Tmax=(Wout-Tm1^*\cdot Nm1)/Nm2 \quad (4)$$

The lower torque restriction Tmin and the upper torq restriction Tmax are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S230):

$$Tm2tmp=(Tr^*+Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S240). Setting the torque command Tm2* of the motor MG2 in this manner restricts the torque demand Tr* to be output to the ring gear shaft 32a or the drive shaft within the range between the input limit Win and the output limit Wout of the battery 50. Equation (5) is readily introduced from the alignment chart of FIG. 7.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S250), before exiting from the drive control routine. The engine ECU 24 receives the target rotation speed Ne* and the target torque Te* and executes fuel injection control and ignition control of the engine 22 to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

When it is determined at step S120 that the drive power demand Pv* is equal to 0 at step S120, the CPU 72 specifies no requirement of power output from the engine 22 and gives a command of cutting the fuel supply to the engine 22 (step S180) According to a concrete procedure, the hybrid electronic control unit 70 sends a fuel cut control signal to the engine ECU 24 via the communication port. The CPU 72 subsequently sets the lower engine speed limit Nemin, which is read corresponding to the vehicle speed V from the lower engine speed limit setting map as described above, to the target rotation speed Ne* of the engine 22 (step S190), and sets the torque command Te* of the engine 22 equal to 0 (step S200). The CPU 72 then executes the processing of steps S210 to S240 to set the torque commands Tm1* and Tm2* of the motors MG1 and MG2 and sends the settings to the engine ECU 24 and to the motor ECU 40 (step S250), before exiting from the drive control routine. When the vehicle speed V is lower than the reference vehicle speed Vref, the lower engine speed limit Nemin is set equal to 0. The engine 22 is accordingly stopped without rotations.

The driver may step on the accelerator pedal 83 in an accelerator-off state, while the hybrid vehicle 20 runs at a relatively high speed. In the accelerator-off state, the drive power demand Pv* is equal to 0. The engine 22 accordingly has a fuel cut and is rotated at the lower engine speed limit Nemin. The driver's depression of the accelerator pedal 83 under such conditions cancels the fuel cut and immediately resumes the intake air flow and the fuel injection to output the torque from the engine 22. The engine 22 is rotated at the lower engine speed limit Nemin, which causes the engine 22 to efficiently output a required power for a constant-speed drive of the hybrid vehicle 20 at the current vehicle speed V. Simple adjustment of the intake air flow and the amount of fuel injection immediately enables the engine 22 to efficiently output the required power for a constant-speed drive of the hybrid vehicle 20. The drive point of the engine 22 changes along the operation line (see FIG. 5), which represents continuation of efficient engine drive points, from the specific drive point that enables the engine 22 to efficiently output the required power for a constant-speed drive. This control ensures a quicker response of the engine 22 to output the required power, compared with the conventional control of driving the engine 22 at a low rotation speed or stopping the engine 22. In the configuration of the hybrid vehicle 20 of the embodiment, as clearly shown by the setting of the tentative motor torque Tm2tmp at step S230, the output torque of the motor MG2 driven with the electric power supply from the battery 50 compensates for a delayed response of the engine 22. The quick output of the required power from the engine 22 reduces the discharge electric power of the battery 50 and desirably decreases the loading of the battery 50. This arrangement thus effectively prevents premature deterioration of the battery 50, which is accelerated by repeated charges and discharges of relatively high electric powers.

As described above, the hybrid vehicle 20 of the embodiment drives the engine 22 at the rotation speed of not lower than the lower engine speed limit Nemin corresponding to the vehicle speed V, so as to enhance the response of the engine 22 to a change in output power demand. The control of the embodiment desirably reduces an insufficiency of the required driving power due to a delayed response of the engine 22, thus lowering the required discharge level of the battery 50 and reducing the load of the battery 50. The lowered charge and discharge levels desirably prevent premature deterioration of the battery 50, which is accelerated by repeated charges and discharges at relatively high electric power levels. The quicker response of the engine 22 also ensures a prompt shift of the drive point of the engine 22 to the efficient engine drive points along the operation line. In the case of no requirement of power output from the engine 22 with the drive power demand Pv* equal to 0, the control procedure of the embodiment stops the fuel injection to the engine 22 and thus desirably improves the fuel consumption.

The hybrid vehicle 20 of the embodiment sets the lower engine speed limit Nemin to the specific rotation speed of the engine 22 at the specific drive point that ensures efficient output of the required power for a constant-speed drive of the hybrid vehicle 20 on the flat road surface at the vehicle speed V. This rotation speed level is, however, not essential, and the lower engine speed limit Nemin may be set to be slightly lower or slightly higher than the specific rotation speed at the specific drive point.

The hybrid vehicle 20 of the embodiment sets the greater between the value '0' and the product of the torque demand Tr*, which depends on the accelerator opening Acc, and the rotation speed Nr of the ring gear shaft 32*a*, to the drive power demand Pv*. One possible modification may set the drive power demand Pv* to the product of the torque demand Tr*, which depends on the accelerator opening Acc, and the rotation speed Nr of the ring gear shaft 32*a*, to the drive power demand Pv*. Another possible modification may set the drive power demand Pv* to the torque demand Tr*, which depends on the brake pedal position BP. In such modified structures, the fuel cut control depends on whether the drive power demand Pv* is a positive level or not.

The hybrid vehicle 20 of the embodiment drives the engine 22 in response to the drive power demand Pv* of higher than 0, while cutting off the fuel supply to the engine 22 in response to the drive power demand Pv* equal to 0. One possible modification may drive the engine 22 in response to the drive power demand Pv* of higher than a preset threshold value Pref (greater than 0), while cutting off the fuel supply to the engine 22 in response to the drive power demand Pv* of lower than the preset threshold value Pref.

Figure 8:
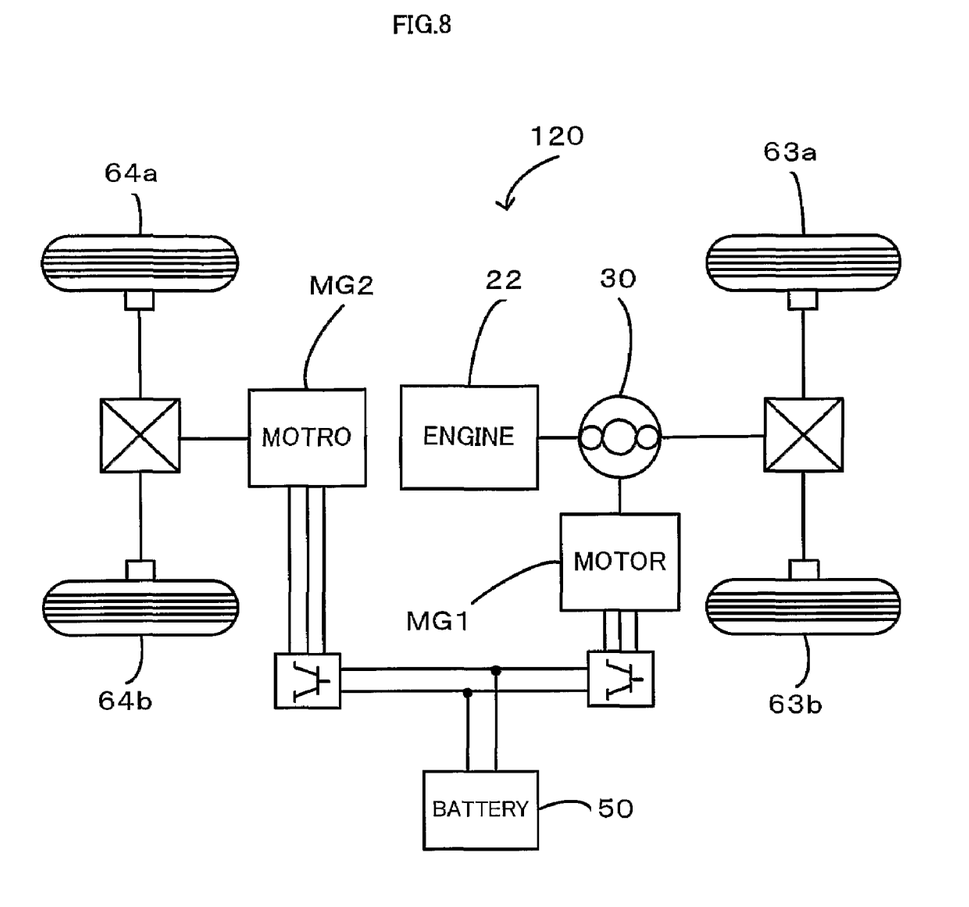
FIG. 8 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32*a*. In one possible modification shown as a hybrid vehicle 120 of FIG. 8, the power of the motor MG2 may be output to another axle (that is, an axle linked with wheels 64*a* and 64*b*), which is different from an axle connected with the ring gear shaft 32*a* (that is, an axle linked with the wheels 63*a* and 63*b*).

Figure 9:
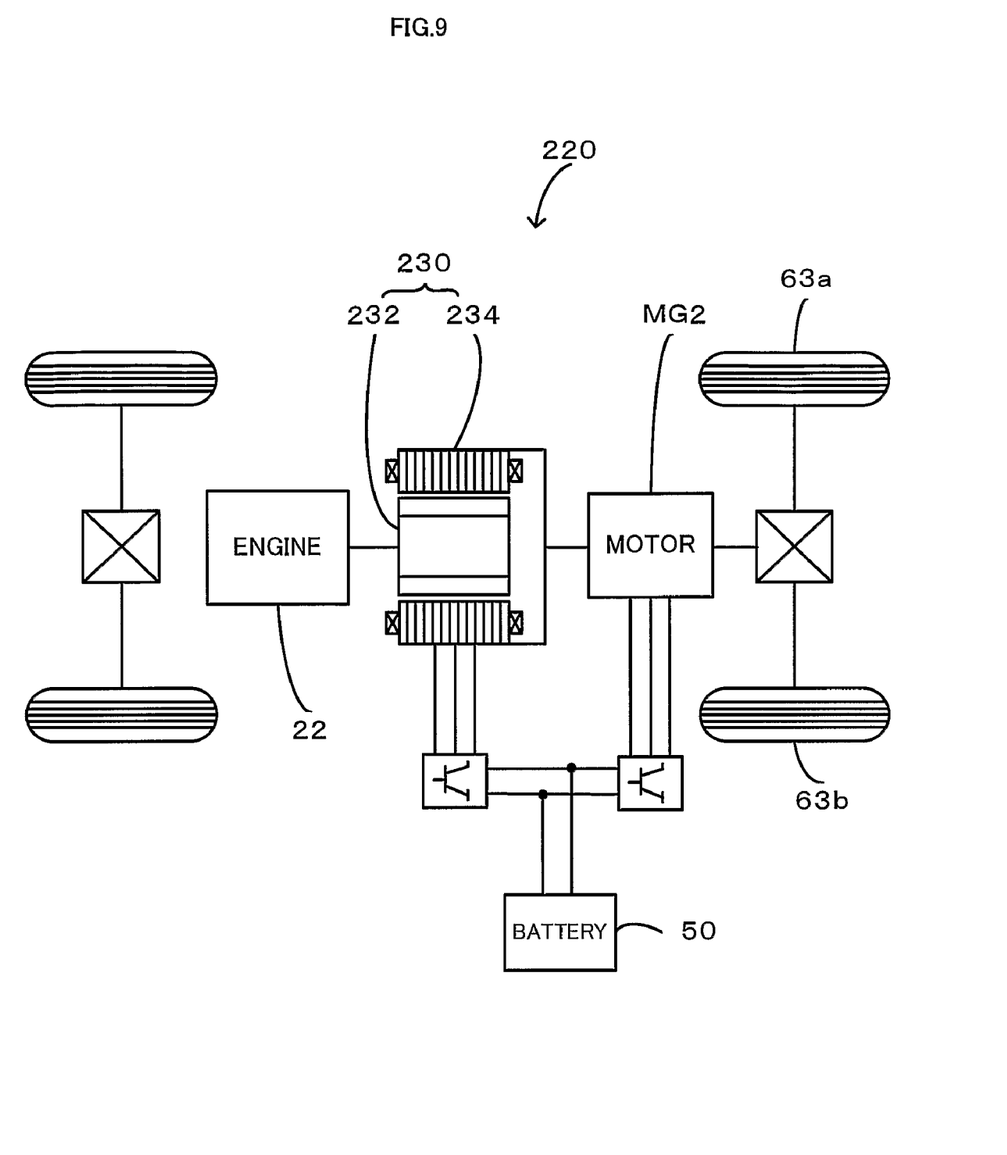
FIG. 9 schematically illustrates the configuration of still another hybrid vehicle in another modified example.

In the hybrid vehicle 20 of the embodiment, the power of the engine 22 is output via the power distribution integration mechanism 30 to the ring gear shaft 32*a* functioning as the drive shaft linked with the drive wheels 63*a* and 63*b*. In another possible modification of FIG. 9, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63*a*, 63*b* and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is desirably applicable to manufacturing industries of hybrid vehicles and power output apparatuses.

The invention claimed is:

1. A hybrid vehicle, comprising:
   an internal combustion engine;
   an electric power-mechanical power input output mechanism that is connected to an output shaft of the internal combustion engine and to a drive shaft linked with one axle of said hybrid vehicle and inputs and outputs power from and to the output shaft and the drive shaft through input and output of electric power and mechanical power;
   a motor that inputs and outputs power from and to either of the one axle and the other axle, which is different from the one axle;
   an accumulator unit that transmits electric power to and from the electric power-mechanical power input output mechanism and the motor;
   a drive power demand setting module that sets a drive power demand required for a drive of said hybrid vehicle;
   a vehicle speed measurement module that measures vehicle speed of said hybrid vehicle;
   a lower rotation speed limit setting module that sets a lower rotation speed limit, which represents a minimum allowable rotation speed of the internal combustion engine, corresponding to the measured vehicle speed; and
   a control module that controls the internal combustion engine, the electric power-mechanical power input output mechanism, and the motor to drive the internal combustion engine at a rotation speed of not lower than the set lower rotation speed limit and to drive said hybrid vehicle with a power corresponding to the set drive power demand.

2. A hybrid vehicle in accordance with claim 1, said hybrid vehicle further comprising:
   a rotation speed demand setting module that sets a rotation speed demand, at which the internal combustion engine is to be driven, corresponding to the set drive power demand,
   wherein said control module controls the internal combustion engine, the electric power-mechanical power input output mechanism, and the motor to drive the internal combustion engine at a higher rotation speed between the set lower rotation speed limit and the set rotation speed demand for enhancing response to an abrupt increase in engine power demand, the enhancement being assured by attaining the engine power increase by a torque rise when needed.

3. A hybrid vehicle in accordance with claim 2, wherein said rotation speed demand setting module sets the rotation speed demand to a specific rotation speed of the internal combustion engine that ensures efficient output of the power corresponding to the set drive power demand from the internal combustion engine.

4. A hybrid vehicle in accordance with claim 1, wherein said lower rotation speed limit setting module sets the lower rotation speed limit to a rotation speed of not lower than a specific rotation speed of the internal combustion engine at a specific drive point that ensures efficient output of a required power from the internal combustion engine for a constant-speed drive of said hybrid vehicle on substantially flat road surface at the measured vehicle speed.

5. A hybrid vehicle in accordance with claim 1, wherein said control module controls the internal combustion engine, the electric power-mechanical power input output mechanism, and the motor to stop fuel injection to the internal combustion engine, when the set drive power demand is equivalent to a predetermined braking power for braking said hybrid vehicle.

6. A hybrid vehicle in accordance with claim 1, wherein the electric power-mechanical power input output mechanism comprises: a three shaft-type power input output module that is linked to three shafts, that is, the output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft.

7. A hybrid vehicle in accordance with claim 1, wherein the electric power-mechanical power input output mechanism comprises a pair-rotor motor that has a first rotor connected to the output shaft of the internal combustion engine and a second rotor connected to the drive shaft and is driven through relative rotation of the first rotor to the second rotor.

8. A power output apparatus that outputs power to a drive shaft, said power output apparatus comprising:
   an internal combustion engine;
   an electric power-mechanical power input output mechanism that is connected to an output shaft of the internal combustion engine and to the drive shaft and inputs and outputs power from and to the output shaft and the drive shaft through input and output of electric power and mechanical power;
   a motor that inputs and outputs power from and to the drive shaft;
   an accumulator unit that transmits electric power to and from the electric power-mechanical power input output mechanism and the motor;
   a power demand setting module that sets a power demand required for the drive shaft;
   a rotation speed measurement module that measures rotation speed of the drive shaft;
   a lower rotation speed limit setting module that sets a lower rotation speed limit, which represents a minimum allowable rotation speed of the internal combustion engine, corresponding to the measured rotation speed; and
   a control module that controls the internal combustion engine, the electric power-mechanical power input output mechanism, and the motor to drive the internal combustion engine at a rotation speed of not lower than the set lower rotation speed limit and to output a power corresponding to the set power demand to the drive shaft.

9. The power output apparatus in accordance with claim 8, further comprising:
   a rotation speed demand setting module that sets a rotation speed demand, at which the internal combustion engine is to be driven, corresponding to the set drive power demand,
   wherein said control module controls the internal combustion engine, the electric power-mechanical power input output mechanism, and the motor to drive the internal combustion engine at a higher rotation speed between the set lower rotation speed limit and the set rotation speed demand for enhancing response to an abrupt increase in engine power demand, the enhancement being assured by attaining the engine power increase by a torque rise when needed.

10. A control method of a hybrid vehicle, said hybrid vehicle comprising:
    an internal combustion engine; an electric power-mechanical power input output mechanism that is connected to an output shaft of the internal combustion engine and to a drive shaft linked with one axle of said hybrid vehicle and inputs and outputs power from and to the output shaft and the drive shaft through input and output of electric power and mechanical power;

a motor that inputs and outputs power from and to either of the one axle and the other axle, which is different from the one axle; and an accumulator unit that transmits electric power to and from the electric power-mechanical power input output mechanism and the motor, said control method comprising the steps of:

(a) setting a drive power demand required for a drive of said hybrid vehicle;

(b) setting a lower rotation speed limit, which represents a minimum allowable rotation speed of the internal combustion engine, corresponding to a measured vehicle speed; and (c) controlling the internal combustion engine, the electric power-mechanical power input output mechanism, and the motor to drive the internal combustion engine at a rotation speed of not lower than the set lower rotation speed limit and to drive said hybrid vehicle with a power corresponding to the set drive power demand.

11. The control method of the hybrid vehicle in accordance with claim 10, the hybrid vehicle further comprising:

a rotation speed demand setting module that sets a rotation speed demand, at which the internal combustion engine is to be driven, corresponding to the set drive power demand, and the control method further comprising the step of controlling the internal combustion engine, the electric power-mechanical power input output mechanism, and the motor to drive the internal combustion engine at a higher rotation speed between the set lower rotation speed limit and the set rotation speed demand for enhancing response to an abrupt increase in engine power demand, the enhancement being assured by attaining the engine power increase by a torque rise when needed.

* * * * *